United States Patent [19]

Meis et al.

[11] Patent Number: 4,459,165
[45] Date of Patent: Jul. 10, 1984

[54] COMMUNICATION CABLE INSTALLATION

[75] Inventors: Michael A. Meis, Maplewood; Robert B. Otto, Champlin; James R. Bylander, Maplewood, all of Minn.

[73] Assignee: Minnesota Mining and Manufacturing Company, Saint Paul, Minn.

[21] Appl. No.: 503,330

[22] Filed: Jun. 10, 1983

[51] Int. Cl.$^3$ .............................................. E04B 2/00
[52] U.S. Cl. ..................................... 156/71; 156/436; 156/554; 156/574; 156/577; 156/579; 206/391; 206/411
[58] Field of Search .......... 156/71, 579, 523, 574–577, 156/436, 554, 55; 206/225, 226, 391, 392–394, 409, 411, 412; 174/117 F

[56] References Cited

U.S. PATENT DOCUMENTS

| 3,936,344 | 2/1976 | Ball et al. | 156/436 |
| 4,313,780 | 2/1982 | Ford | 156/579 |
| 4,328,061 | 5/1982 | Off et al. | 156/574 X |

Primary Examiner—David A. Simmons
Attorney, Agent, or Firm—Donald M. Sell; James A. Smith; Terryl K. Qualey

[57] ABSTRACT

A communication cable applicator and method in which a communication cable component supply including two rolls of pressure sensitive adhesive tape and a plurality of lengths of communication conductors supported and guided on a frame across a resilient applicator roller on which the conductors are sandwiched between the tapes and the composite is applied to a floor prior to carpeting as a user pushes the apparatus across the floor.

12 Claims, 11 Drawing Figures

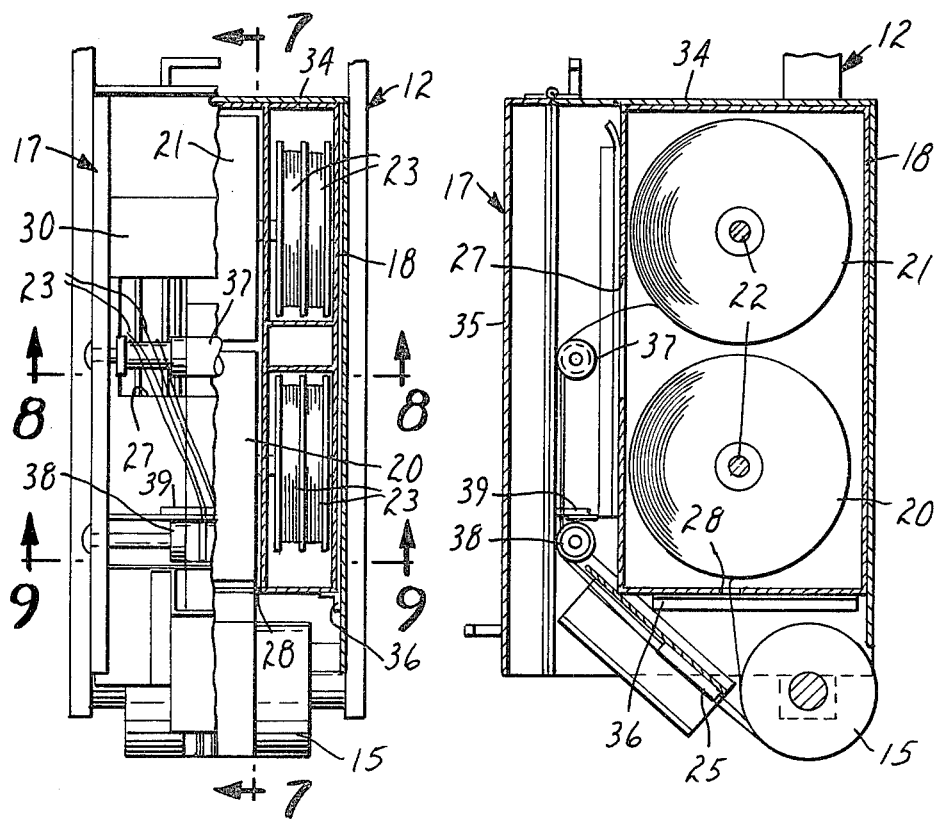
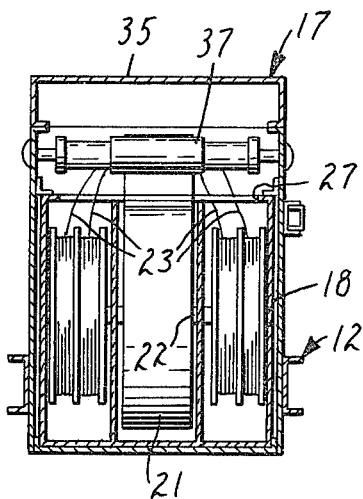 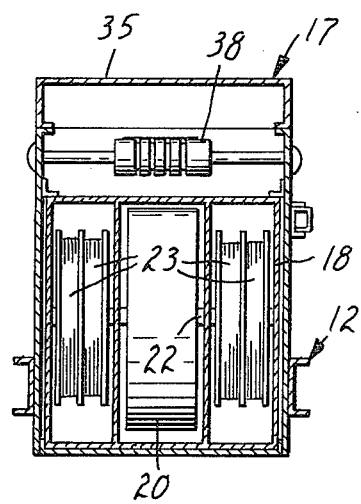
FIG.6   FIG.7   FIG.8   FIG.9

COMMUNICATION CABLE INSTALLATION

FIELD OF THE INVENTION

The present invention relates to an apparatus and method for applying a communication cable to a floor prior to carpeting.

BACKGROUND OF THE INVENTION

In new office buildings, and in many older buildings, the furniture and interior walls are being made easily movable to accommodate personnel relocation and organizational change. In such offices, communications wiring cannot be placed within hollow partitions or attached to permanent walls as has been common practice in buildings with permanent interior walls. At the same time, there has been an ever increasing use of carpeting, usually in the form of carpet squares, to cover the floors in office buildings.

A lack of permanent walls and the use of carpeting has led to an increasing use of flat multi-conductor cable which is applied to the floor prior to carpeting and which runs to a permanent wall or to a hollow column that is a permanent part of the building, where it is connected to a more conventional communication cable. Out on the floor, the end of the under carpet cable is connected to a conventional telephone connector which extends through the carpet where a desk is to be positioned. Addition or movement of a communication cable to accommodate a new office arrangement is simply accomplished by lifting the carpet squares along the path necessary to lay the new cable, applying the new cable and replacing the carpet squares that were removed. The application of a cable in a new installation prior to any carpeting being applied and the application of a cable to a floor where carpet squares have been removed are both herein referred to as applying a communication to a floor prior to carpeting the floor.

The prior art includes several under carpet flat cables that are manufactured, rolled into specified lengths and then unrolled by the workman and applied to the floor prior to carpeting. Such cables are disclosed in U.S. Pat. Nos. 4,219,928; 4,319,075; and 4,283,593. In applying these cables the workman must get down on his hands and knees on the floor to apply the cable to the floor. Moreover, to change the direction of the cable run it is necessary to fold the cable upon itself thereby increasing the thickness of the material under the carpet. The fold also produces an area where the cable is sharply bent upon itself and the conductors may be broken by people walking over it or moving objects across it unless special precautions are taken to protect the fold back areas.

SUMMARY OF THE INVENTION

The present invention provides an apparatus and method for applying a communication cable to a floor prior to carpeting. The apparatus comprises a frame, a handle at one end of the frame, and a resilient applicator roller mounted at the opposite end of the frame to roll along the floor as a user holds the handle and walks forward. A communication cable component supply is mounted on the frame between the ends thereof and comprises a container, two rolls of tape supported for rotation about spaced parallel axes parallel to the applicator roller, and a plurality of lengths of communication conductors supported within the container for incremental withdrawal therefrom. Each of the tapes has a polymeric backing with a pressure sensitive adhesive on one surface and has sufficient stretch to make a 90 degree turn along a twenty-four inch radius, the rolls of tape being wound in the same direction about their axes. Means are provided for guiding the tapes into aligned face to back contact on the applicator roller with a non-adhesive surface of one of the tapes against the applicator roller and means are provided for guiding the plurality of lengths of communication conductors from the container into parallel between the tapes at the applicator roller.

The method comprises the steps of providing the communication cable applicator, pushing the applicator along a floor in a path desired for the communication cable to bring the tapes together with the communication conductors between them and to apply the composite cable to the floor with the pressure sensitive adhesive on one of the tapes adhering the composite to the floor, cutting the composite cable at the end of the desired cable run, and applying terminal connectors to the conductors at the ends of the cable. The apparatus and method of the invention permit a workman to apply an under carpet communication cable from a standing position without requiring any fold back areas to turn corners necessitated in the application of the communication cable.

THE DRAWING

In the drawing:

FIG. 6 is a top view of the cable component supply and applicator roller with portions broken away to illustrate the interior of the supply;

FIG. 7 is a longitudinal cross sectional view taken along line 7—7 of FIG. 6;

FIG. 8 is a tranverse cross sectional view taken along line 8—8 of FIG. 6;

FIG. 9 is a transverse cross sectional view taken along line 9—9 of FIG. 6;

DESCRIPTION OF THE PREFERRED EMBODIMENT

Figure 1:
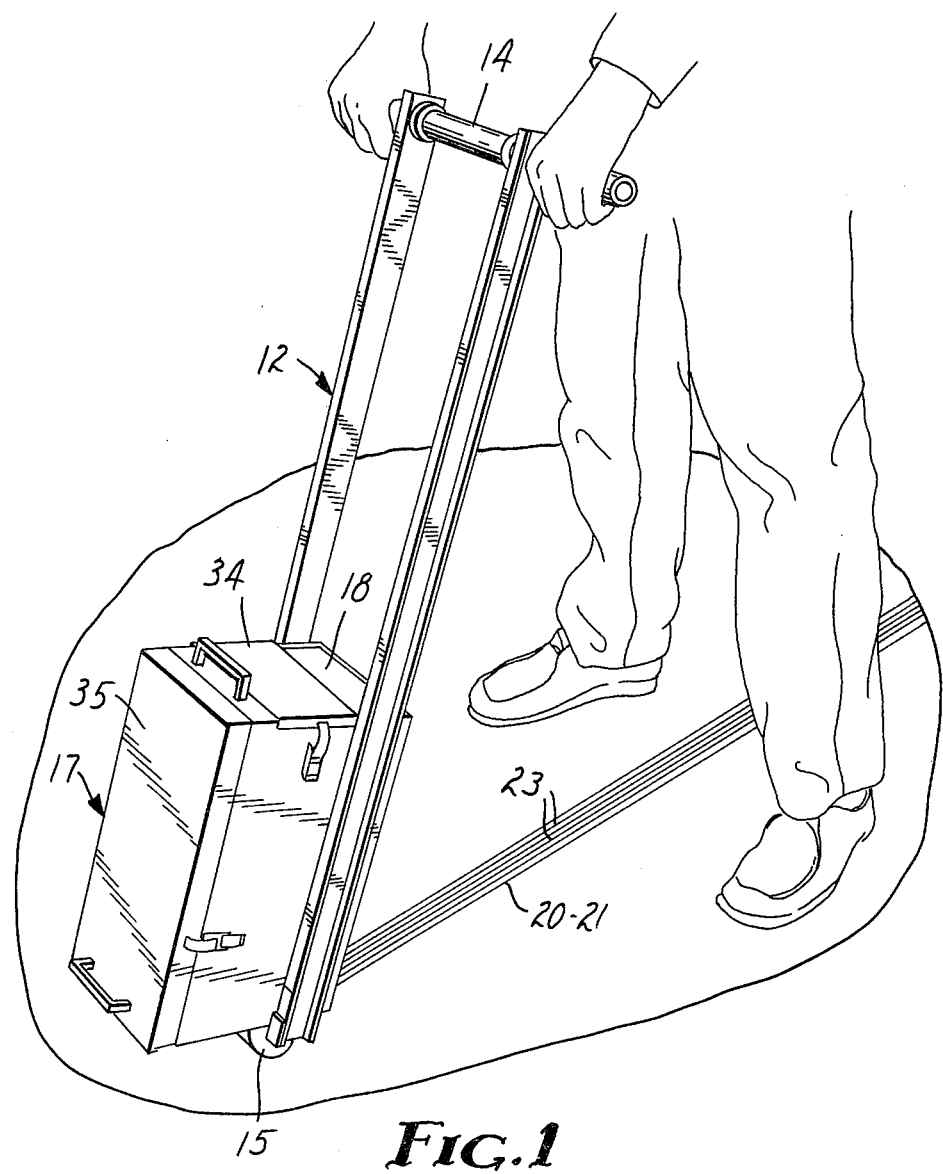
FIG. 1 is a perspective view of a workman utilizing a communication cable applicator constructed in accordance with the present invention in applying a communication cable in accordance with the method of the invention.
Figure 2:
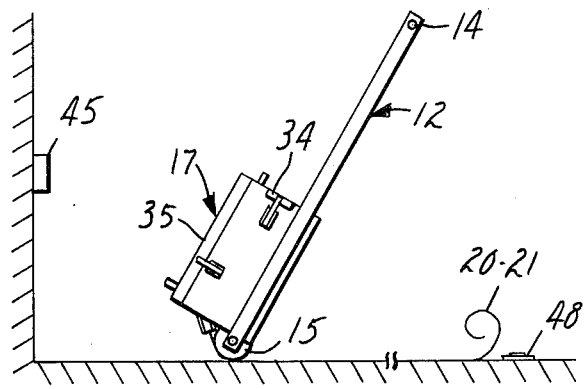
FIG. 2 is a side elevation view of the cable applicator after a portion of a length of communication cable has been applied to a floor.
Figure 3:
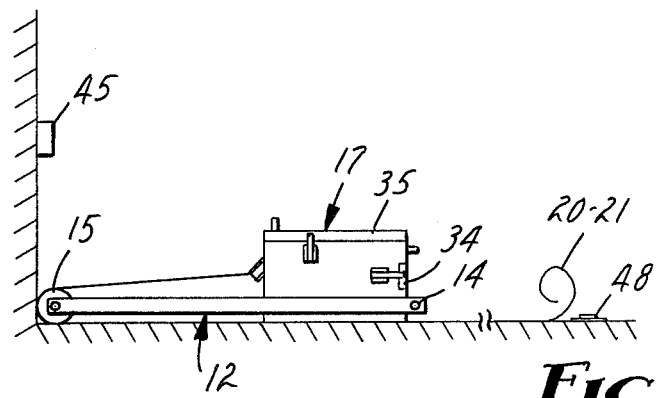
FIG. 3 is a side elevation view similar to that of FIG. 2 after application of the cable up to a wall and sliding of the cable component supply housing along the applicator frame to a cut-off position.

The communication cable applicator includes a frame 12, a handle 14 at one end of the frame and a resilient applicator roller 15 mounted at the opposite end of the frame to roll along the floor as a user holds the handle and walks forward. A communication cable component supply is mounted on the frame 12 between the ends thereof and includes a housing 17 permanently attached to the frame 12, a component supply container 18, two rolls of tape 20 and 21 and a plurality of lengths of communication conductors 23.

The two rolls of tape 20 and 21 are supported within the container 18 on axles 22 for rotation about spaced parallel axes parallel to the applicator roller 15. Each tape has a polymeric backing with a pressure sensitive adhesive on one surface and having sufficient stretch to make a 90 degree turn along a twenty-four inch (60 mm) radius, the rolls of tape being wrapped in the same direction about their axes. In the illustrated embodiment the communication conductors are eight lengths of insulated copper wires 23 wound on individual spools supported for independent rotation within the container 18. Four spools of wire 23 are mounted on an axle 22 with each roll of tape 20 and 21, two spools to each side of each roll of tape.

Figure 10:
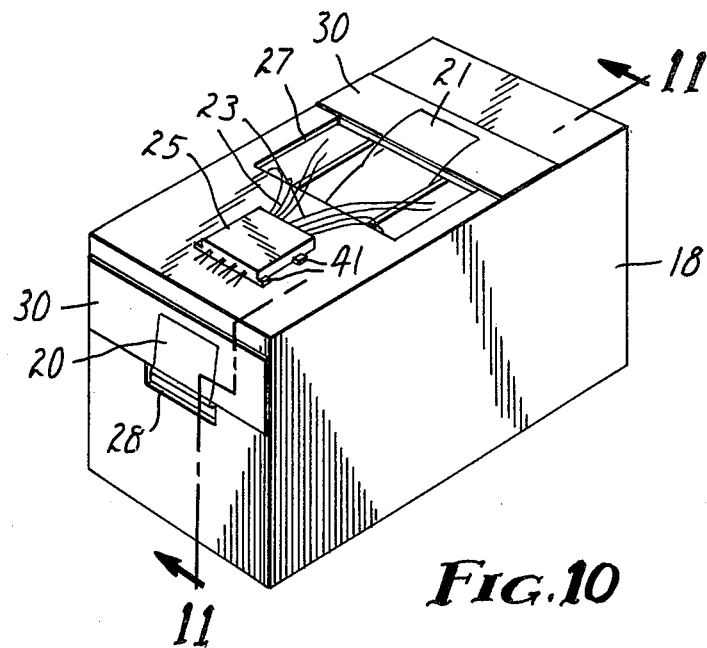
FIG. 10 is a perspective view illustrating the front one side and the top of a communication cable component supply container constructed in accordance with the invention.
Figure 11:
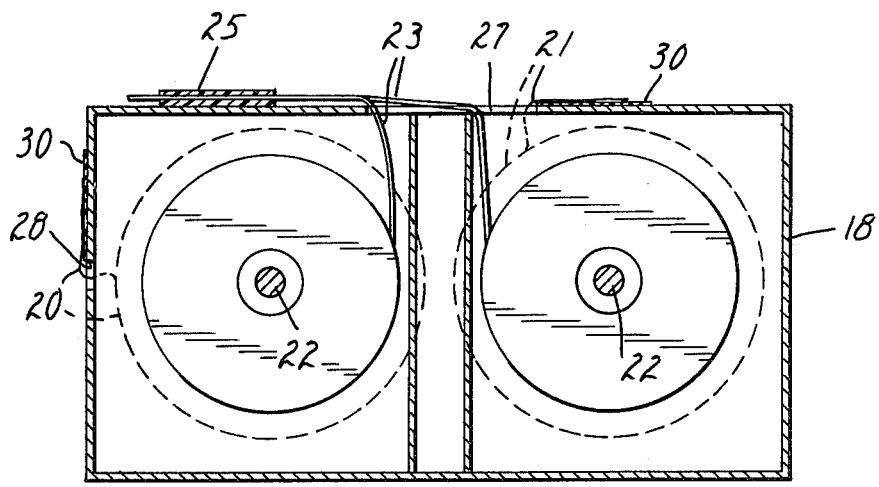
FIG. 11 is a longitudinal cross sectional view taken along 11—11 of FIG. 10.

The tapes 20 and 21 and wires 23 are preferably supplied in a cardboard box container 18 so that the container may be removed and discarded when the supplies of tape and wires have been exhausted. To make the cardboard box container 18 a handlable supply item, one end of each of the wires 23 extends through a guide shoe 25 to guide the wires in parallel between the tapes 20 and 21. The wires extend through four apertures through the guide shoe 25 to guide the wires into four parallel wire pairs. A large opening 27 is provided in the top of the container 18 through which the wires 23 and one tape 21 exit from the container and a smaller opening 28 is provided in the front end wall of the container 18 for withdrawal of the other tape 20 from the container. A release liner 30 is provided adjacent each of the openings 27 and 28 against which the adhesive surface of each of the tapes 20 and 21 is contacted during the assembly of the container 18 (see FIGS. 10 and 11) and from which they may be readily manually stripped when the container is to be put into use.

The housing 17 has a rear door 34 through which the cardboard container 18 is inserted into and removed from the housing and a top door 35 which is opened for initial threading of the tapes 20 and 21 and the wires 23 into position on the applicator roller 15. A pair of edge stops 36 in the housing 17 near the applicator roller 15 locate the front of the container 18 when it is inserted into the housing through the rear door 34.

Within the housing 17, above the position for the container 18 are two cylindrical guides 37 and 38 and a guide comb 39. The rearward guide 37 guides the rearward tape 21 on its central portion and it has reduced diameter end portions to separately guide four of the wires 23 out of the container 18 on each of the end portions. The forward guide 38 has a series of four parallel grooves to guide the wires in four pairs beneath the non-adhesive surface of the tape 21, and the guide comb 39 is positioned adjacent the front cylindrical guide 38 to guide the wires 23 into the grooves in the front guide 38. The guide shoe 25 has four edge tabs 41 that slide under retention fingers on the housing to retain the guide shoe just above the applicator roller 15 to guide the wires 23 in parallel between the tapes 20 and 21 at the applicator roller 15.

The forward tape 20 goes directly from the opening 28 in the container 18 onto the applicator roller 15 with its non-adhesive surface against the applicator roller. Thus, on the applicator roller 15 the wires 23 are guided in parallel onto the adhesive surface of the forward tape 20 and are sandwiched between the pressure sensitive surface of the forward tape 20 and the non-adhesive surface of the rearward tape 21. In the areas where there are no wires 23, the adhesive surface of the forward tape 20 contacts the non-adhesive surface of the rearward tape 21 to bond the composite together. The adhesive surface of the rearward tape 21 faces outward on the applicator roller 15.

In use, the doors 34 and 35 of the housing 17 are opened and a component supply container 18 is slid through the rear opening of the housing and against the stops 36. The rear door 34 may then be closed and latched shut. Next, the wire guide shoe 25 is moved behind the cylindrical rear guide 37 and over the top of it to draw the eight wires 23 onto the reduced sections at the ends of the guide 37. The guide shoe 25 is then pulled over the top of the cylindrical front guide 38 to position the wires in the grooves in guide 38 and in the teeth of the guide comb 39. The guide shoe 25 is then slid into its retention position adjacent the applicator roller 15 (see FIG. 7) with its edge tabs 41 under the retention fingers on the housing. Next, the end of the forward tape 20 is pulled from its release liner 30 and it is pulled out until its non-adhesive surface lies on the applicator roller 15. The ends of the wires extending out of the guide shoe 25 are next pulled on to bring them into contact with the pressure sensitive adhesive surface of the tape 20 on the applicator roller. Finally, the end of the rearward tape 21 is pulled from its release liner 30 and threaded across the tops of cylindrical guides 37 and 38 and into alignment with the forward tape 20 on the applicator roller 15 with its non-adhesive surface contacting the adhesive surface of the tape 20 on the applicator roller and the wires 23 between the two tapes. The top housing door 35 may then be closed and latched.

FIGS. 1 through 5 illustrate the use of the communication cable applicator to apply an eight conductor cable to make connections between a modular telephone jack 43 and a modular electrical connector 44 mounted in a plastic housing 45 on a permanent wall 46. Wires extend from the back of the modular connector 44 through the wall 46 in a standard telephone cable.

Figure 4:
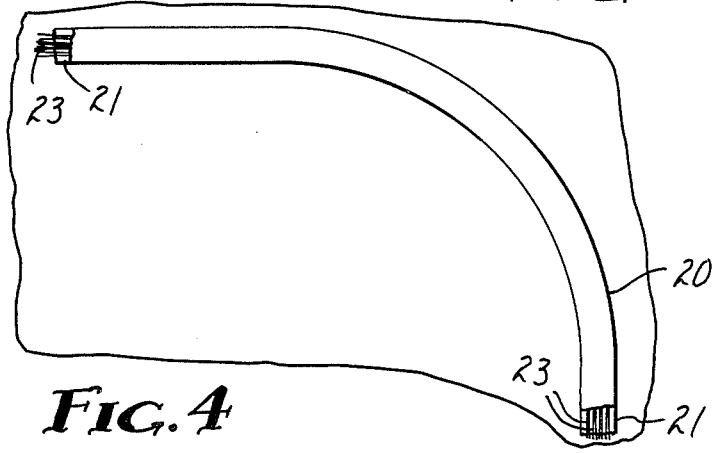
FIG. 4 is a top view of a section of cable applied according to the method of the invention through a 90 degree turn.
Figure 5:
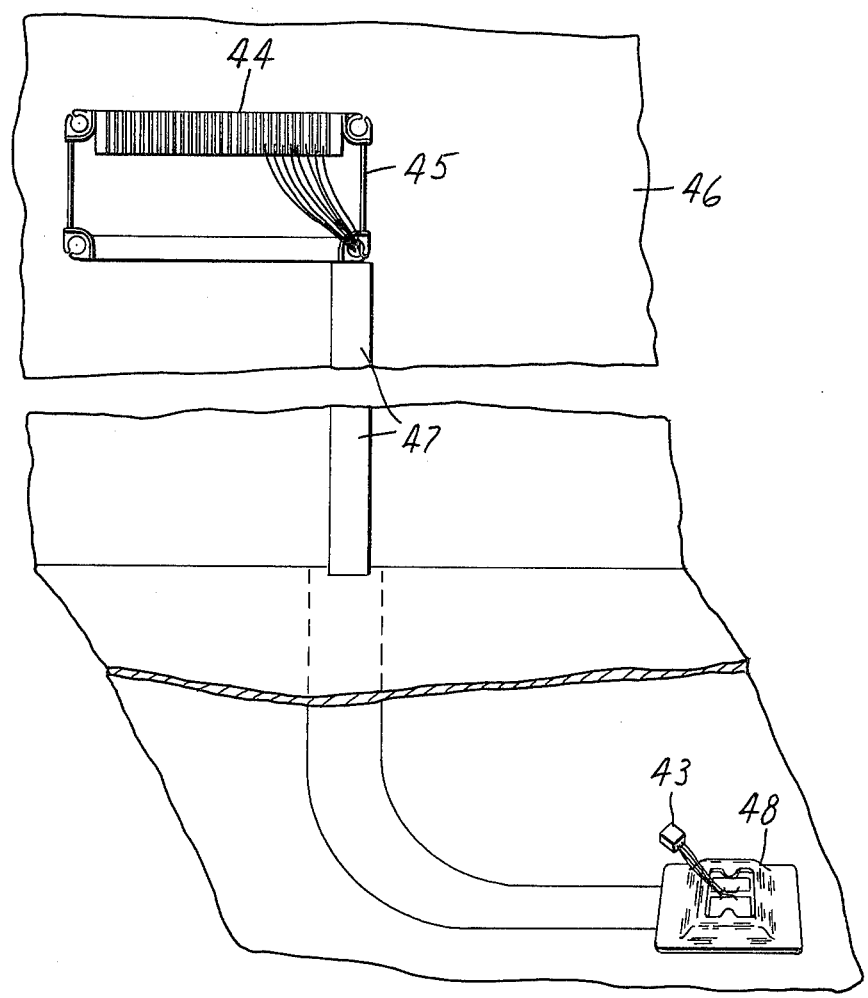
FIG. 5 is a perspective view of a communication cable applied in accordance with the method of the present invention terminated in a modular connector on a wall and connected to a standard modular telephone jack at its opposite end on the floor.

Starting at the location where the floor connection is to be made, the workman contacts the pressure sensitive adhesive surface of the tape 21 on the applicator roller 15 against the floor. Holding onto the handle 14, as illustrated in FIG. 1, he walks forward thereby pulling the tape 21 adhered to the floor and the tape 20 and wires 23 adhered thereto from their supplies and adhering the composite to the floor. If the desired path from the floor location to the wall box 45 is not straight, the workman can turn the apparatus as he applies the cable. Such turns are illustrated in FIGS. 4 and 5. Within the present invention the radius of such turns is specified as being no greater than twenty-four inches (60 mm), a radius which is believed to be a commercially practical upper limit in view of the common usage of eighteen inch (45 mm) square carpet squares and the usual desire to make turns in the smallest space possible.

When the workman reaches the permanent wall 46 he lays the applicator on the floor while moving it forward to bring the applicator roller 15 into contact with the wall. The housing 17 is slidable along the frame 12 from the application position illustrated in FIGS. 1 and 2 to a cut-off position illustrated in FIG. 3. As the workman lays the applicator on the floor he pulls the housing 17 to the cut-off position thereby exposing an extra length of the tapes 20 and 21 and the wires 23 between the applicator roller 15 and the housing 17. At the base of the wall the tapes are cut off while the wires 23 are cut off adjacent the housing and then inserted into a plastic duct 47 extending from the floor to the wall box 45. In the wall box the individual wires are pushed into insulation displacement contact elements which strip the insulation and make electrical contact to the copper conductor to connect each of the wires to a wire extending out of the opposite surface of the connector 44 and through the permanent wall 46. When all of the telephones to be connected to the modular connector 44 have been connected a plastic cover is installed over the wall box 45.

On the floor where the telephone jack 43 is to be located the ends of the wires 23 are separated from the tapes 20 and 21 and one end of each of the wires is pushed into an insulation displacement contact element which has a second wire connected to it running to the telephone jack 43. The connectors and the modular jack are illustrated as being retained in a metal floor housing which is bonded to the floor by a pressure sensitive adhesive after the cable is connected therein. When the carpeting is complete a telephone may be plugged into the jack 43, the telephone jack 43 tucked into the metal housing 48 and a solid cover applied over the housing nearly flush with the upper surface of the carpet.

It has been found preferable to use an applicator roller 15 made of rubber with a surface durometer of 40 and a diameter of 4 inches (10 mm). This provides sufficient resiliency so that the wires 23 will resiliently depress the surface of the roller 15 and the roller will contact the nonadhesive surface of the tape 20 on the floor between the wires as well as over the wires and firmly press the composite against the floor so as to assure a good bond to the floor. The presently preferred tape for both tapes 20 and 21 is a 2 inch (5 cm) wide vinyl plastic tape having a backing thickness of 0.06 inch (0.15 cm), a tape thickness of 0.07 inch (0.18 cm), an adhesion to steel of 45 oz. per in. width (49 newtons per 100 mm width), a tensile strength of 20 lbs. per in. width (350 newtons per 100 mm width) and a stretch at break of 225%. This tape is sold as No. 470 Electroplating Tape by the Industrial Tape Division of Minnesota Mining and Manufacturing Company with offices in St. Paul, Minn. It has been found using this tape that a 90 degree turn can be made while applying the composite cable with a 16 inch (40 mm) radius without any wrinkling of the tape and that a 8 inch (20 mm) radius can be turned with only minor wrinkling while retaining the parallelium between the wires 23 which is the most critical requirement.

The tapes 20 and 21 are preferably supplied in approximately 300 foot (100 meter) rolls and the spools of wire 23 are supplied in similar lengths.

We claim:

1. Apparatus for applying a communication cable to a floor prior to carpeting the floor, comprising:
    a frame,
    a handle at one end of said frame,
    a resilient applicator roller mounted at the opposite end of said frame to roll along the floor as a user holds said handle and walks forward,
    a communication cable component supply mounted on said frame between said ends thereof, comprising:
        a container,
        two rolls of tape supported for rotation about spaced parallel axes parallel to said applicator roller, each said tape having a polymeric backing with a pressure sensitive adhesive on one surface and having sufficient stretch to make a 90 degree turn along a twenty-four inch radius, said rolls of tape being wrapped in the same direction about their axes,
        a plurality of lengths of communication conductors supported within said container for incremental withdrawal therefrom,
    means for guiding said tapes into aligned face to back contact on said applicator roller with the non-adhesive surface of one of said tapes against said applicator roller, and
    means for guiding said plurality of lengths of communication conductors from said container into parallel between said tapes at said applicator roller.

2. The apparatus of claim 1 wherein said rolls of tape are supported within said container.

3. The apparatus of claim 2 wherein said cable component supply includes a housing permanently attached to said frame and said container is a box within said housing which may be removed and refilled or discarded when the supplies of tape and communication conductors have been exhausted.

4. The apparatus of claim 3 wherein said means for guiding a plurality of lengths of communications conductors includes a guide shoe releasably attached to said frame through which one end of each of said conductors extends to guide said conductors in parallel between said tapes.

5. The apparatus of claim 3 wherein said cable component supply housing is slidable along said frame from an application position nearer said applicator roller to a cut-off position nearer said handle.

6. A method of applying a communication cable to a floor prior to carpeting the floor, comprising the steps of
    providing a communication cable applicator comprising:
    a frame,
    a handle at one end of said frame,
    a resilient applicator roller mounted at the opposite end of said frame to roll along the floor as a user holds said handle and walks forward,
    a communication cable component supply mounted on said frame between said ends thereof, comprising:
        a container,
        two rolls of tape supported for rotation about spaced parallel axes parallel to said applicator roller, each said tape having a polymeric backing with a pressure sensitive adhesive on one surface and having sufficient stretch to make a 90 degree turn along a twenty-four inch radius, said rolls of tape being wrapped in the same direction about their axes,
        a plurality of lengths of communication conductors supported within said container for incremental withdrawal therefrom, means for guiding said tapes into aligned face to back contact on said applicator roller with the non-adhesive surface of one of said tapes against said applicator roller, and means for guiding said plurality of lengths of communication conductors from said container into parallel between said tapes at said applicator roller, pushing said applicator along a floor in a path desired for the communication cable to bring the tapes together with the communication conductors between them and to apply the composite cable to the floor with the pressure sensitive adhesive on one of the tapes adhering the composite to the floor, cutting the composite cable at the end of the desired cable run, and applying terminal connectors to the conductors at the ends of the cable.

7. The method of claim 6 wherein said cable component supply includes a housing permanently attached to said frame, said container is a box removably retained in said housing and said rolls of tape are supported within said cardboard box, and including the steps of putting a said cardboard supply box in said housing and threading said tapes and said communications conductors through said guide means prior to pushing said applicator along the floor.

8. The method of claim 7 wherein said cable component supply housing is slidable along said frame from an application position nearer said applicator roller to a cut-off position nearer said handle, and including the step of sliding said housing from said application position to said cut-off position prior to cutting the composite cable.

9. A communication cable component supply for use in an apparatus for applying a communication cable to a floor prior to carpeting the floor, comprising:

a container, two rolls of tape supported within said container for rotation about spaced parallel axes, each said tape having a polymeric backing with a pressure sensitive adhesive on one surface and having sufficient stretch to make a 90 degree turn along a twenty-four inch radius, said rolls of tape being wrapped in the same direction about their axes, a plurality of lengths of communciation conductors supported within said container for incremental withdrawal therefrom, openings for in said container withdrawal of said tapes and said wires incrementally therefrom, and a guide shoe through which one end of each of said conductors extends to guide said conductors in parallel between said tapes, said guide shoe being formed for attachment to a said apparatus for applying a communication cable to guide said conductors in the use of said apparatus.

10. The communication cable component supply of claim 9 wherein said container is a box.

11. The communication cable component supply of claim 10 including a pressure sensitive adhesive release liner on the exterior surface of said box adjacent said openings for withdrawal of said tapes, one end of each of said tapes extending out of said cardboard box and being releasably adhered to its associated release liner.

12. The communication cable component supply of claim 10 wherein said box is made of cardboard.

* * * * *